June 14, 1966   S. E. ALBERTSON, JR   3,255,985
ROTARY WINGED KITE

Filed June 26 1964   2 Sheets-Sheet 1

INVENTOR.
STANLEY E. ALBERTSON, JR
BY John U. Damian
ATTORNEY

June 14, 1966 S. E. ALBERTSON, JR 3,255,985
ROTARY WINGED KITE

Filed June 26, 1964 2 Sheets-Sheet 2

INVENTOR.
STANLEY E. ALBERTSON, JR
BY
JOHN U. DAMIAN
ATTORNEY

United States Patent Office 3,255,985
Patented June 14, 1966

3,255,985
ROTARY WINGED KITE
Stanley E. Albertson, Jr., 34037 Burton Lane,
Livonia, Mich.
Filed June 26, 1964, Ser. No. 378,136
6 Claims. (Cl. 244—153)

This invention relates to kites and more specifically to an improved free flying rotary wing, or air foil.

It is one of the objects of this invention to provide an improved free floating rotary kite easy to fly and capable of withstanding high wind velocities.

Still a further object of this invention is to provide a free flying rotary wing kite which is simple in construction and easy to assemble and take down.

It is a further object of this invention to provide a free flying rotary kite having a simple bridle centering means.

Other objects and advantages of this invention will become more apparent when considered in connection with the accompanying drawings, wherein.

Figures 1, 4:
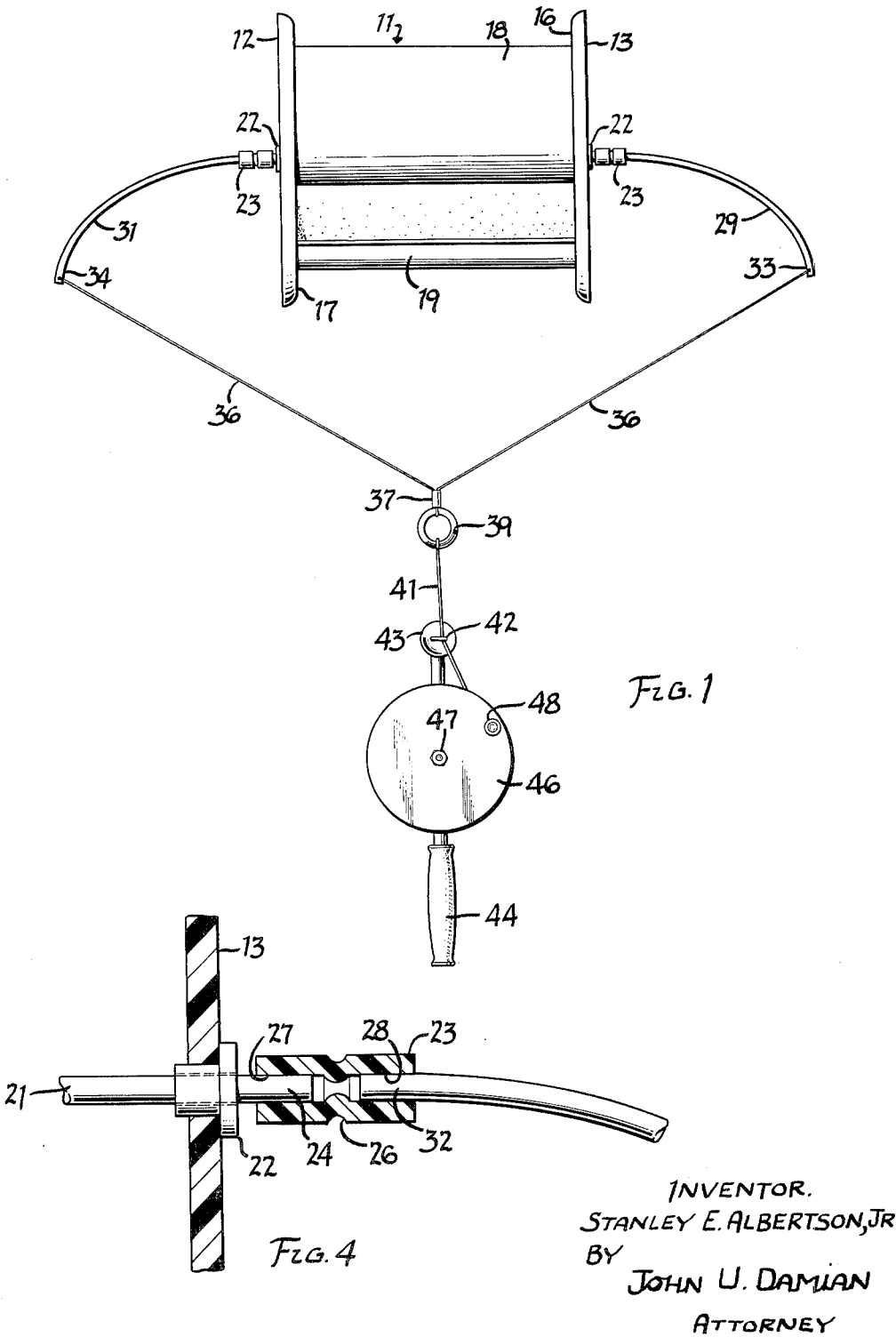
FIGURE 1 is a plan elevational view of the device.
FIGURE 4 is an enlarged fragmentary view, partly in section, of the shock absorbing and quick disconnect means.
Figure 2:
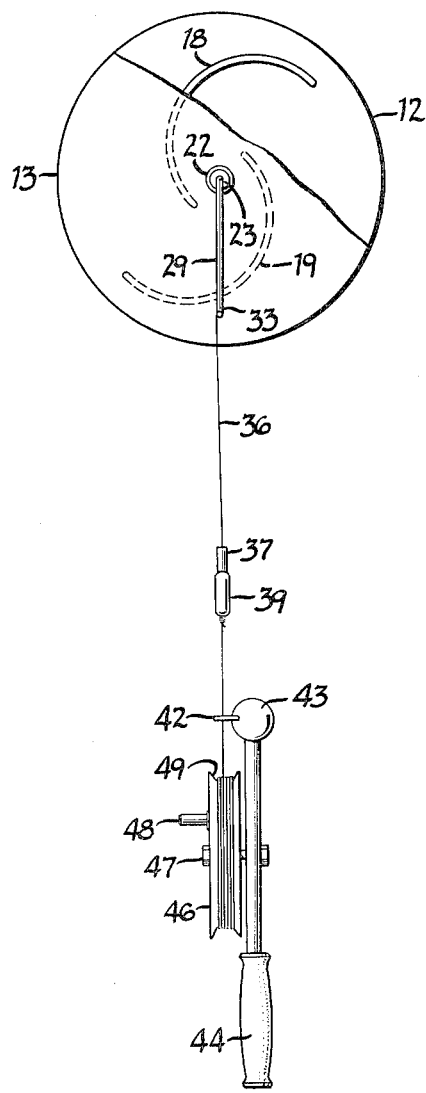
FIGURE 2 is a side elevational view, partly in section, of the device shown in FIGURE 1, with parts in section.
Figure 3:
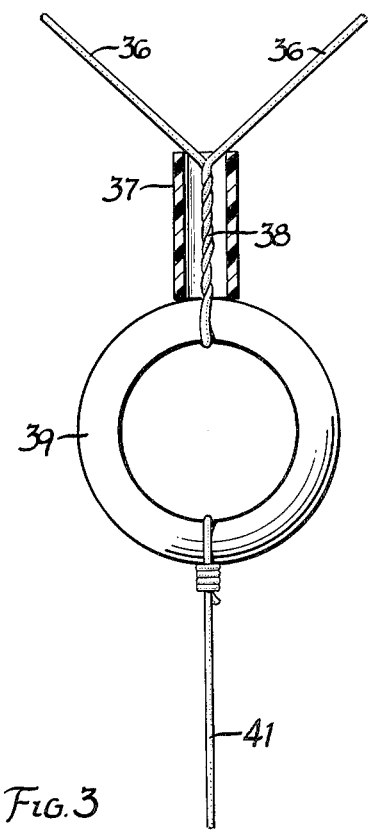
FIGURE 3 is an enlarged fragmentary view, partly in section, of the bridle centering means.

Referring now to the drawings, reference character 11 indicates in general a rotary wing. A rotary wing and its principle of flight is well known, but herein disclosed is a novel arrangement of assembling such a wing combined with other elements to produce new results. Wing 11 is comprised of dished end members 12 and 13. The general structure of the rotary wing 11 is disclosed in my prior U.S. Letters Patent No. 3,026,073 issued on March 20, 1962. The inside faces 16 and 17 are formed to receive semi-tubular members 18 and 19 as described in my aforementioned Letters Patent. Semi-tubular members 18 and 19 form the air foils for the rotary wing 11.

Rotary wing 11 is provided with fixed plastic bearings 22 (only one of which is shown) in each of the end members 12 and 12. Shaft 21 is journaled in bearings 22 and is provided with terminal end portion 24 extending outwardly of the end members 12 and 13. A tubular coupling 23 is provided with end portion 27 adapted to slidably engage the shaft terminal end portion 24. Coupling 23 can be made of only one of the lightweight plastics such as nylon and may be provided with an inward radial deformation 26 to prevent the coupling 23 from frictionally engaging the bearings 22 and prevent the free rotary movement of the wing 11. End portion 28 is located on the opposite side of the deformation 26 for slidably receiving end portion 32 of flexible shock absorbers 29 and 31. In FIGURE 1, the shock absorbers 29 and 31 are shown in the "flexed" flying position of the kite. Tubular nylon has been found to be a successful material for this purpose. Additionally, the coupling connection of the shock absorbers 29 and 31 to the terminal ends 24 by coupling 23 is simple and effective. Damage to the rotary wing 11 by excessive winds may be avoided by the flexing qualities of these members.

It is contemplated that the sliding fit tolerance of the shock absorbers 29 and 31, coupling 23 and shaft terminal end portions 24 will disconnect upon winds reaching a predetermined force thereby saving the kite from breakage.

Shock absorbers 29 and 31 are apertured at their respective outer ends 33 and 34 to which is tied a bridle 36. Prior to tying the bridle 36 to the ends 33 and 34, bridle 36, which is made from twisted nylon string, is extended through a ring 39 and through a nylon tube 37. Because of the twisting qualities of the nylon thread making up the bridle 36, the portion of the bridle extending through the tube 37 is naturally twisted such as at 38. The twisting of the nylon string at this point enables the ring 39 to be centered and held so that an equal pull on each terminal end sections 33 and 34 is obtained. Unless the ring 39 is centered with respect to the bridle 36 the rotary wing kite will not fly.

A nylon or other light kite string 41 is secured to the ring 39. String 41 is stored in the groove 49 of pulley 46. Attachment means 47 secure the pulley about its axis to a medial portion of handle 44. The terminal end of handle 44 is provided with a ball-like portion 43 upon which may be secured a guide 42 through which extends kite string 41. Kite string 41 is wound in groove 49 by rotation of the pulley 46 by means of handle 48 mounted to the outside of the pulley.

In operation, handle 44 is gripped by the hand with the thumb extended over and in contact with the pulley 46. Unwinding of the kite string 41 is thus easily controlled while retracting the string is done easily by a simple "reeling" in motion.

It will be understood that the invention is not to be limited to the exact construction shown and described but that various changes and modifications may be made without departing from the spirit and scope of the invention as defined in the appended claims.

What I claim is:

1. In a device of the character indicated, including a free flying rotary wing rotatable about an axis, a pair of flexible shock absorbers having terminal end portions, quick disconnect means securing each of said flexible shock absorbers to the rotary wing on said axis, a bridle connecting the terminal end portions of said flexible shock absorbers, manually adjustable centering means slidably mounted upon said bridle, and a string wound upon a pulley and secured to said manually adjustable centering means.

2. The structure defined by claim 1 which is further characterized in that said quick disconnect means comprises a tubular member adapted to slidably receive said flexible shock absorber on said axis.

3. The structure defined by claim 1 which is further characterized in that said bridle comprises a string, said centering means comprising a ring through which said string extends through, and a tube, said string being extended through said tube and being secured to the terminal end portions of said flexible shock absorbers.

4. The structure defined by claim 3 which is further characterized in that said string is comprised of a braided construction inducing the string extending through said tube to be twisted about itself thereby holding said ring in frictional engagement with said tube.

5. The structure defined by claim 1 which is further characterized in that said pulley is provided with a groove for storing said string, a first handle, attachment means securing said pulley upon said first handle for rotatable movement, and a second handle secured to said pulley for imparting rotational movement to said pulley.

6. A free flying kite comprising in combination a rotary wing having an axis about which the rotary wing rotates, said wing having bearing means disposed on said axis, a shaft journalled in said bearing means, coupling means mounted upon said shaft in spaced relationship to said rotary wing, tubular shock absorbers mounted upon said coupling means, a bridle secured to said tubular shock absorbers, said bridle having manually adjustable centering means, a pulley mounted upon a handle, and a kite string wound upon said pulley and attached to said manually adjustable centering means.

References Cited by the Examiner
UNITED STATES PATENTS

| | | | |
|---|---|---|---|
| 2,494,430 | 1/1950 | Carnwath | 244—153 |
| 2,501,442 | 3/1950 | Donaldson | 244—153 |
| 3,026,073 | 3/1962 | Albertson | 244—153 |

MILTON BUCHLER, *Primary Examiner.*

A. E. CORRIGAN, *Assistant Examiner.*